Patented Sept. 29, 1953

2,653,895

UNITED STATES PATENT OFFICE 2,653,895

INSECT REPELLENTS

Nathan L. Drake, College Heights, Md., and Sidney Melamed, Philadelphia, Pa., assignors to the United States of America as represented by the Secretary of the Army No Drawing. Original application January 11, 1949, Serial No. 70,383. Divided and this application August 30, 1950, Serial No. 187,831

2 Claims. (Cl. 167—30)

This application is a division of our application Serial No. 70,383, filed January 11, 1949, for Insect Repellents (now abandoned).

This invention relates to insect repellents.

We have found that the application of a lower alkyl ester or alicyclic ester of an N-substituted glycine of the general formula $$YCH_2COOA$$

wherein A is an open chain or an alicyclic ring substituent having not more than 6 carbons, and wherein Y is an amino group to which a saturated or unsaturated cyclic substituent having up to 6 carbons in the ring is attached to the nitrogen atom by the carbon of a $CH_2$ group, when applied to the human skin or to a fabric, effectively repels insects, particularly Aedes aegypti and Anopheles quadrimaculatus.

Among suitable N-substituted glycine whose esters possess insect repellent properties are N-N-pentamethylene glycine and N-benzyl glycine; among their suitable esters are for instance the ethyl, butyl and cyclohexyl-esters.

Tests to measure the repellency of the above-mentioned compounds against insects by skin application were conducted by smearing the compound on the arms of test personnel, who then thrust their arms into cages containing insects. The arms were exposed for 30-minute intervals at 3 minutes each until the first insect bite.

Tests to measure the repellency of fabrics impregnated with the above-mentioned compounds against insects were conducted by uniformly impregnating mercerized cotton hose with the compound at a rate equivalent to 3.3 gms. per sq. ft., drawing the dried hose over the arms of test personnel, who then thrust their covered arms into cages containing insects for 1 to 2 minutes. If no bites or less than 5 bites were received, the tests were repeated each successive day until 5 or more bites during one exposure were received.

The following table illustrates the results obtained by the above test methods against Aedes aegypti and Anopheles quadrimaculatus, as examples of insects against which the invention is applicable, by using compounds in accordance with the present invention:

| Material | Repellency on Application to skin | | Repellency of Impregnated Fabric against Aedes aegypti |
|---|---|---|---|
| | Aedes aegypti | Anopheles quadrimaculatus | |
| cyclohexyl ester of N.N-pentamethylene glycine. | 256 min | 50 min | over 10 days. |
| butyl ester of N-benzyl glycine. | 259 min | 48 min | over 5 days. |
| ethyl ester of N-benzyl glycine. | over 120 min | | Do. |

Surprisingly, it was found that the ethyl ester of N-phenyl glycine, a compound wherein the amino group is substituted by a phenyl group directly attached to the nitrogen atom, lacks insect repellent properties.

The preparation of the above compounds is illustrated by the following typical examples:

Example 1

60 gms. (.35 mol) of piperidine and 78 gms. (.35 mol) of cyclohexyl bromoacetate are reacted in the presence of ether and alternately acidified with 35% HCl and alkalized with 30% KOH. The reaction product, the cyclohexyl ester of N,N-pentamethylene glycine, boils at 101° C. at .25 mm. pressure; refractive index: $n_D^{24}=1.4771$; yield: 65 gms.

Example 2

Equimolecular quantities of benzylamine (34 gms.) and butyl bromoacetate (63.8 gms.) are heated together without a catalyst. The reaction product is neutralized with potassium hydroxide and distilled. 30 gms. of the butyl ester of N-benzyl glycine are obtained as a liquid boiling at 119–120° C. at .3 mm. pressure and whose refractive index is $n_D^{21}=1.4972$.

For ease of application the glycine esters contemplated by the present invention may be incorporated in a suitable inert liquid or solid carrier such as mineral oil, alcohol, petrolatum, etc. For facile and uniform fabric impregnation, they may be applied thereto in an inert solvent such as alcohol, ether, etc.

Having thus described our invention, we claim:

1. An Aedes aegypti repellent composition comprising the butyl ester of N-benzyl glycine in a non-toxic insect-repellent-adjuvant as a carrier therefor.

2. A process of repelling Aedes aegypti, comprising applying the butyl ester of N-benzyl glycine to the region from which Aedes aegypti are to be repelled.

NATHAN L. DRAKE.
SIDNEY MELAMED.

References Cited in the file of this patent

UNITED STATES PATENTS

| Number | Name | Date |
|---|---|---|
| 2,293,034 | Moore | Aug. 18, 1942 |

OTHER REFERENCES

Mannich et al., Ber. 45, 314–322 (1912).

Eddy et al., Chemical Abstracts, volume 41 (1947), pages 3575 to 3576. Especially, entry "cyclohexyl ester of N,N-pentamethyleneglycine."